United States Patent [19]

Wilmer et al.

[11] Patent Number: 4,945,434
[45] Date of Patent: Jul. 31, 1990

[54] MAGNETIC RECORDING HEAD EMPLOYING AN I-BAR CORE STRUCTURE

[75] Inventors: Richard C. Wilmer, Campbell, Calif.; Joseph T. Di Bene, South Lake Tahoe, Nev.

[73] Assignee: Maxtor Corporation, San Jose, Calif.

[21] Appl. No.: 280,029

[22] Filed: Dec. 5, 1988

[51] Int. Cl.$^5$ ............................................. G11B 17/32
[52] U.S. Cl. .................................................... 360/103
[58] Field of Search ................................. 360/102–104

[56] References Cited

U.S. PATENT DOCUMENTS

| | | | |
|---|---|---|---|
| 4,821,131 | 4/1989 | Gotoh | 360/103 |
| 4,823,216 | 4/1989 | Atesman | 360/103 |
| 4,851,942 | 7/1989 | Kumasaka | 360/103 |

*Primary Examiner*—A. J. Heinz
*Attorney, Agent, or Firm*—Blakely, Sokoloff, Taylor & Zafman

[57] ABSTRACT

A magnetic recording head for longitudinal rigid-disk recording is described. The recording head is characterized by an I-bar shaped magnetic core which is attached flushly along the side of a slider body. The core has a pole body section around which a wire coil is wrapped for inducing magnetic flux changes in the media during write operations and for sensing magnetic flux which emanates from the disk surface during readback operations. The I-bar design is relatively inexpensive to manufacture, mechanically durable and improves overall head performance.

13 Claims, 3 Drawing Sheets

U.S. Patent  Jul. 31, 1990  Sheet 1 of 3  4,945,434
FIG_1A (PRIOR ART)
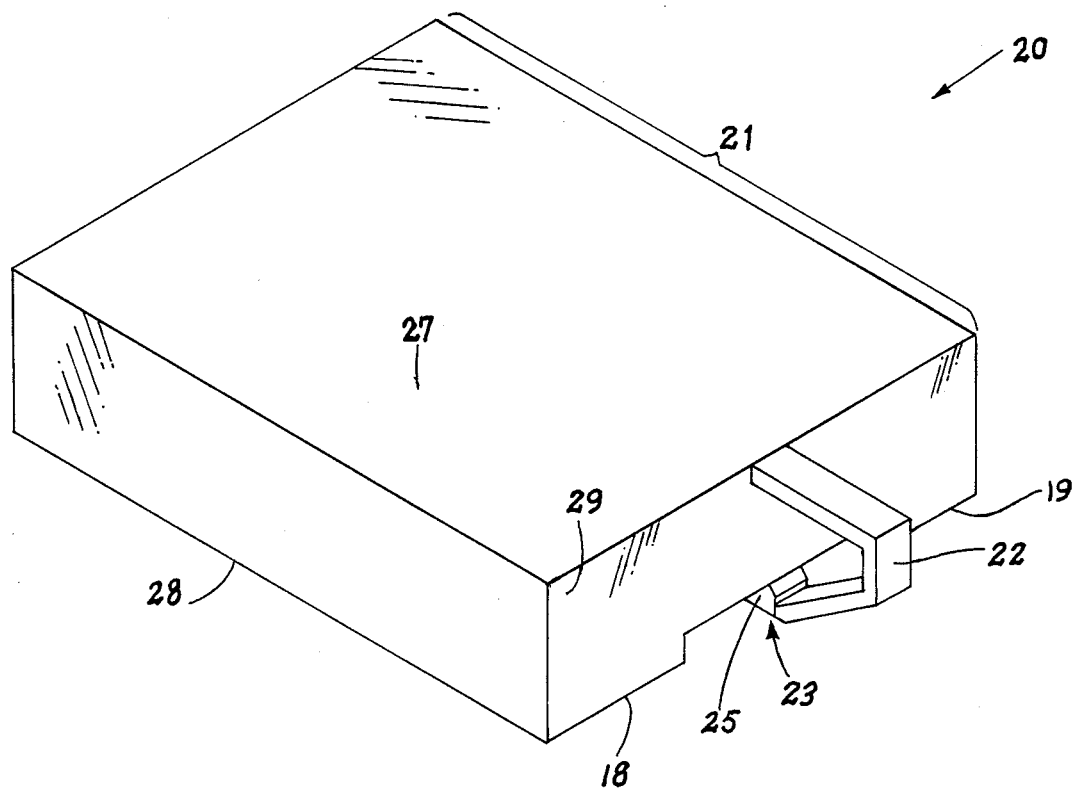
FIG_1B
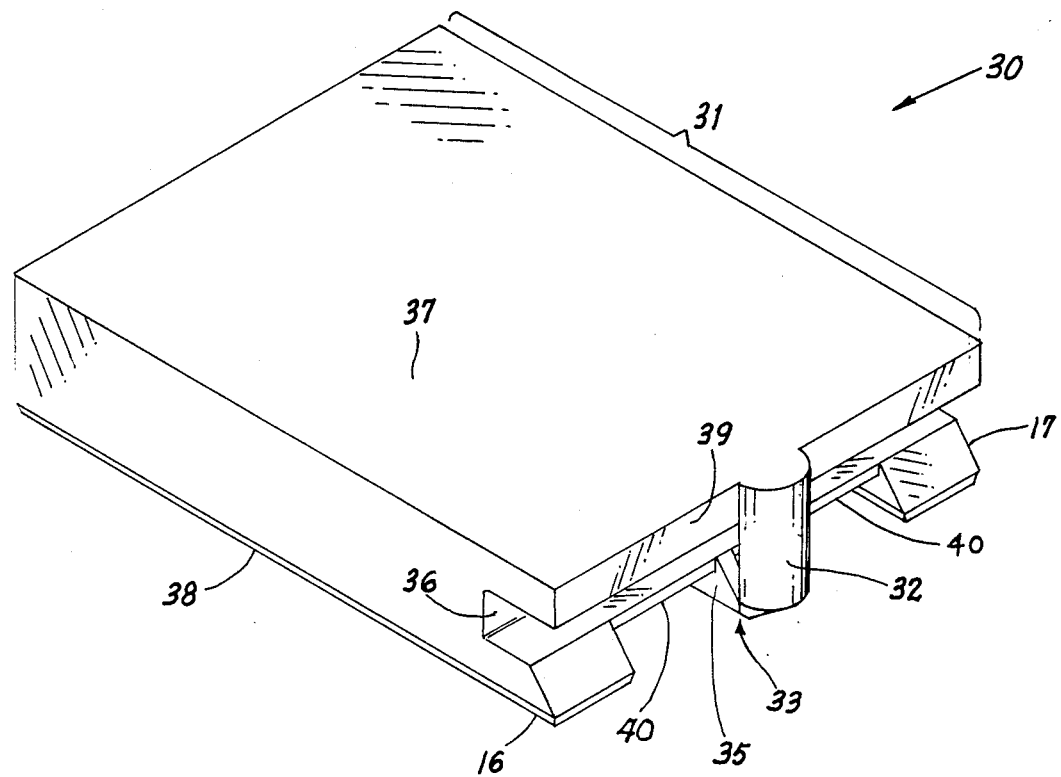

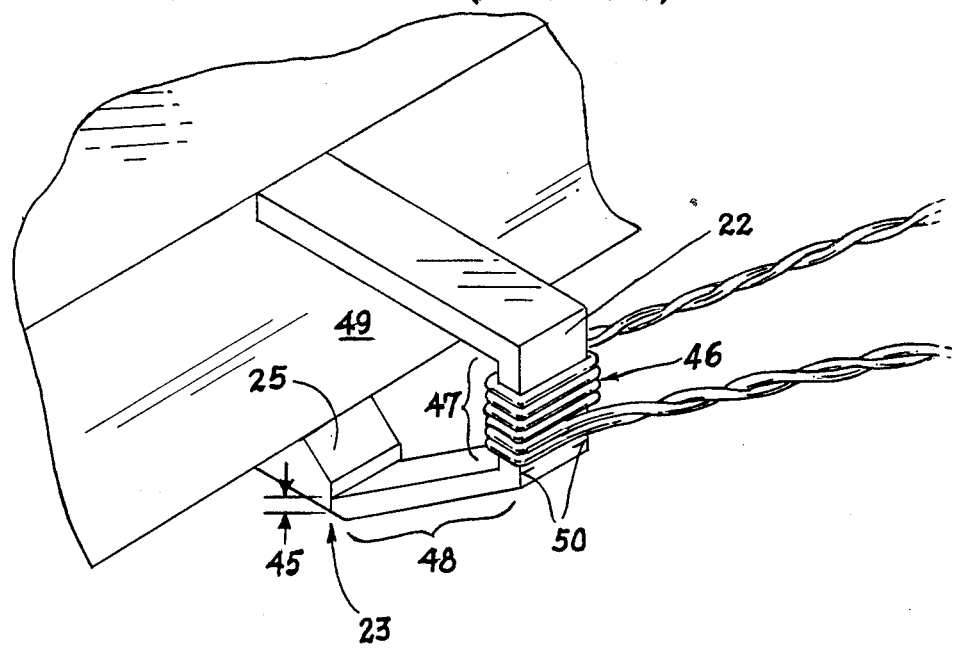
FIG_2A (PRIOR ART)
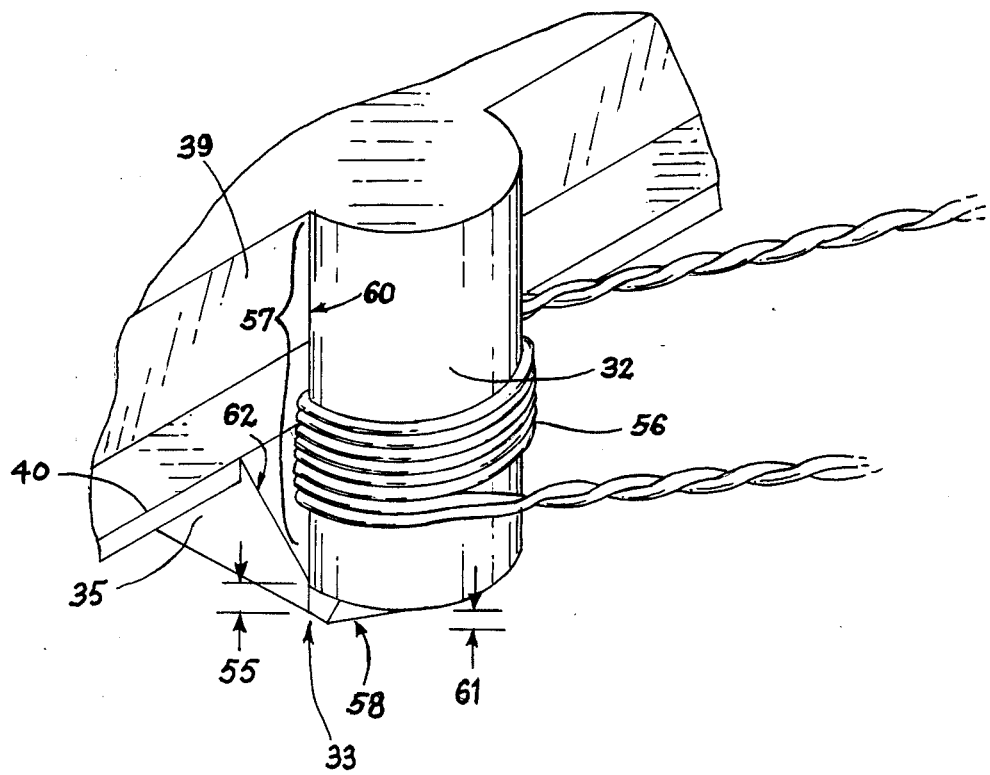
FIG_2B

FIG_3
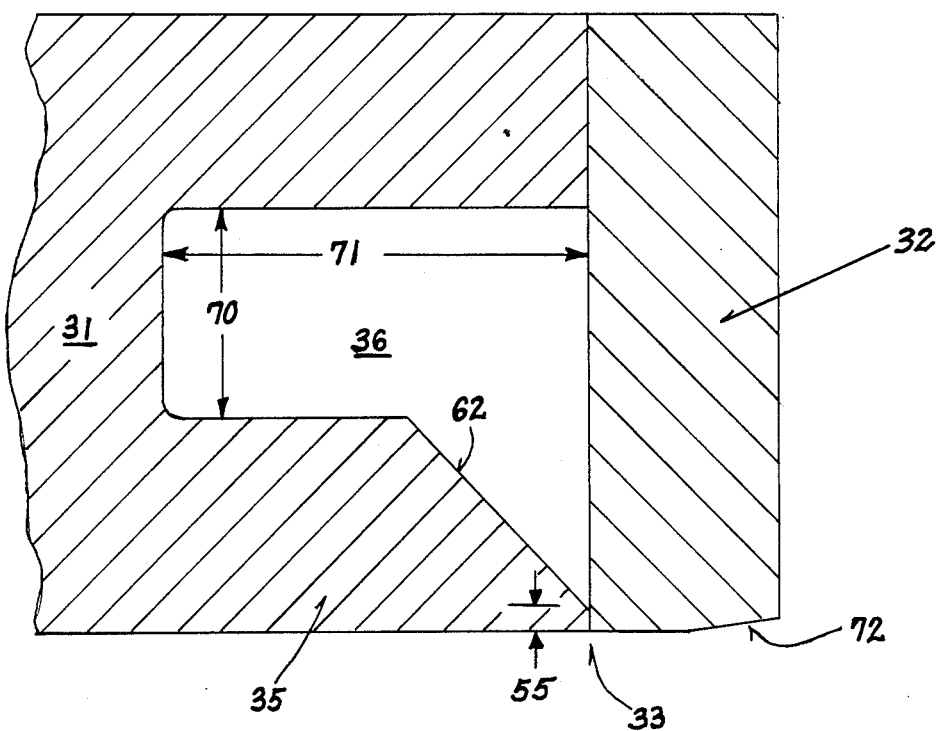
FIG_4
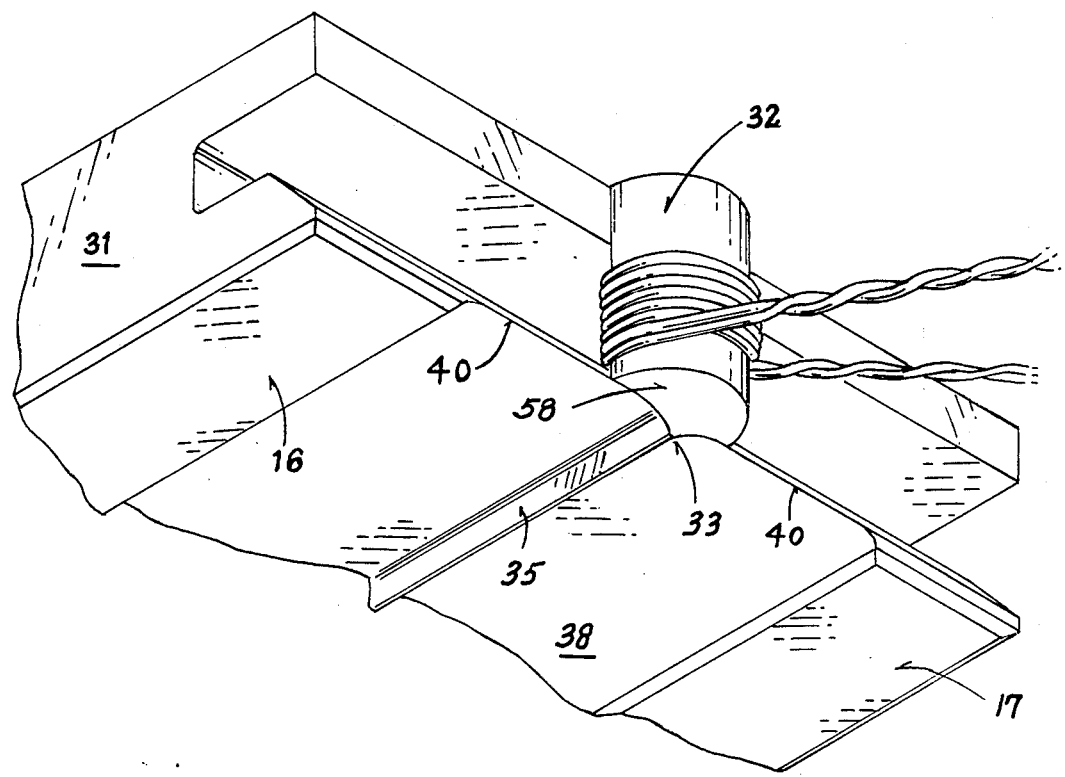

MAGNETIC RECORDING HEAD EMPLOYING AN I-BAR CORE STRUCTURE

FIELD OF THE INVENTION

The present invention relates to the field of magnetic recording heads for rigid-disk recording, particularly where the recording direction is longitudinal.

BACKGROUND OF THE INVENTION

Magnetic recording involves mechanical motion between the media and the heads in which the spacing between these components must be made critically small. In rigid-disk drives, a magnetic core element is mounted on a slider which flies above the rotating disk. Very often, the core element and slider are manufactured such that the entire head is monolithic. The slider portion is generally designed to create hydrodynamic pressure and weight the head to achieve a flying height barely above the disk surface (typically on the order of 10 microinches or less).

Most magnetic recording heads in use today are based upon the familiar inductive coil and magnetic core head design which is well-known in the art. The general trend in development has been to require smaller dimensions in gap length, track width, and core geometry to satisfy the increasing demand for higher recording densities and bandwidths. There are also corresponding competitive pressures to produce a head as inexpensively as possible. As head size shrinks and performance is enhanced, the durability of various head elements to physical and mechanical stresses becomes critical. Thus, what is needed is a strong, durable and low-cost magnetic recording head having minimized gap dimensions.

The gap in a recording head is designed to produce a field amplitude capable of recording the storage media. The core geometry and materials are designed to provide adequate field strength at the signal frequency along the direction of the media motion in order to maximize the recording efficiency. Magnetic flux is delivered to the gap by a magnetic core element having a wire coil wrapped radially around one of the poles of the core. The wire coil around the core is usually designed to be close to the gap to improve the efficiency of the inductive coupling between the coil and the poles of the gap.

One widely utilized magnetic head has a core structure shaped like a "C", often referred to as a "C-bar" design. FIG. 1 shows a magnetic recording head having a C-bar core member. An enlarged view of the C-bar structure is also shown in FIG. 2a.

Several problems have been associated with the C-bar head design. For instance, because one pole of the C-bar structure protrudes outward from the slider portion of the head it is especially prone to fracture or breakage. This most frequently occurs during the manufacturing process. Usually, both the slider and core are manufactured out of a ferrite material. The brittle nature of ferrite and the ever shrinking dimensions of the magnetic head exacerbate the problem of breakage, making the C-bar magnetic head design expensive to manufacture as well as reducing recording head manufacturing yields.

Another problem associated with the C-bar structure has to do with the edges of the core pole in the area where the writing coil is wrapped. Since these edges are square, they have a tendency to cut into the wire coils degrading head performance. As a result, these edges must be rounded at some point in the manufacturing process. Typically, this involves sanding of the edges of the C-bar core by hand; a process which is called "blending". Due to the fragile nature of the C-bar, blending is another source of yield loss which may occur.

Yet another problem with the C-bar structure involves the bottom rail used to form one pole of the recording gap. In the C-bar device, this rail extends outward from the slider body. Because the rail is unsupported, it is easily cracked or broken off.

Therefore, what is needed is a high-performance, mechanically resilient recording head which and is relatively inexpensive to manufacture. As will be seen, the present invention provides a high performance, low-cost magnetic recording head which is well suited for rigid-disk applications. The head of the present invention employs an I-bar shaped magnetic core element which is more durable and better performing than the prior art C-bar head.

SUMMARY OF THE INVENTION

A magnetic recording head for longitudinal rigid-disk recording is described. The recording head includes a slider body having a slot located along the trailing side of the slider body. The slot extends across the side and is parallel to the top and bottom surfaces. An I-bar member having a flat inner surface, which is attached flushly to the trailing side and over the slot, forms the magnetic core which is used for reading and writing of information to the disk media.

The I-bar core member is comprised of a straight, rigid piece of ferrite or metallic material. It has a body section, around which a wire coil is wrapped, and a probe tip section which is tapered to form a recording gap with the beveled end of a rail running along the bottom of the slider body. A support plate, which is defined by the bottom part of the slot, provides strength and stability to the rail. The wire coil is used for inducing magnetic flux changes in the media during write operations and for sensing magnetic flux which emanates from the disk surface during read back operations.

One objective of the present invention is to provide a more durable magnetic recording head.

It is another object of the present invention to provide a magnetic recording head which is relatively inexpensive to manufacture and which does not suffer yield losses from breaking or fracturing of the core member.

It is still another object of the present invention to provide a magnetic recording head with enhanced read/write performance capabilities.

BRIEF DESCRIPTION OF THE DRAWINGS

FIG. 1a is a composite view of a prior art magnetic recording head for use in rigid-disk recording. The prior art recording head is characterized by a C-shaped core element.

FIG. 1b is a composite view of the magnetic recording head of the currently preferred embodiment of the present invention having an I-bar shaped core member.

FIG. 2a is an expanded view of the core element of the prior art recording head.

FIG. 2b is an expanded view of the I-bar shaped core member of the currently preferred embodiment of the present invention.

FIG. 3 is a cross-sectional view of the I-bar structure of the currently preferred embodiment of the present invention showing the relationship of the slot, core member and center rail.

FIG. 4 illustrates the relationship of the center rail, outer rails and core member in the currently preferred embodiment of the present invention.

DETAILED DESCRIPTION OF THE INVENTION

A magnetic recording head for application in rigid disk storage units is described. The recording head of the present invention is characterized by an I-bar core member which is used to form the read/write recording gap. In the following description, numerous specific details are set forth, such as specific dimensions, etc., in order to provide a thorough understanding of the present invention. It will be obvious, however, to one skilled in the art that these details are not required to practice the invention. In other instances, well-known elements, materials and the like are not set forth in detail in order not to unnecessarily obscure the present invention.

Referring to FIGS. 1a and 1b, the prior magnetic recording head is shown adjacent to the currently preferred embodiment of the present invention. The prior art recording head 20 is comprised of a slider body 21 which is ordinarily machined from a single block of ferrite. This slider has a bottom air-bearing surface 28, a top surface 27 and a trailing side 29. The C-shaped magnetic core element 22 is mounted along the top portion of trailing side 29 of slider block 21. Located along bottom surface 28 are two wide outer rails 18 and 19 which provide the disk-bearing surface. When the disk is stationary, slider rails 18 and 19 rest on the disk surface; then adopt a stable flying position directly above the disk surface when the disk is spinning.

Typically, C-shaped core 22 is composed of a ferrite material and is bonded onto slider body 21 (also machined from a ferrite block) using a high temperature process. The bonding process is carried out in such a way as to produce a narrow gap 23 (shown in FIGS. 1a and 2a as a vertical line) between the pole of core element 22 and a center rail 25 positioned along bottom 28 of slider 21. When current is passed through the wire coil (shown in FIG. 2a as element 46) wrapped around the outer protruding pole of core member 22, a magnetic flux is developed across gap 23. The recording field produced from gap 23 is the longitudinal leakage field associated with the gap since the lines of force are semi-circles about the gap center line. The magnetic field strength delivered is directly proportional to the gap length and gap height. A small gap length and low gap height allows for higher density recording. For optimum recording performance, it is necessary to maintain the appropriate pole tip height and gap length. Performance can also be enhanced by improving the efficiency of the inductive coupling between the coil and the poles of the gap. This can be accomplished by wrapping the coil around the core pole section very near to the gap, therby minimizing magnetic flux loss.

FIG. 1b shows the recording head of the currently preferred embodiment of the present invention. Similar to FIG. 1a, recording head 30 comprises a slider body 31 having a top surface 37, a bottom surface 38 and a trailing side surface 39. Rather than having a greatly protruding core member, recording head 30 of FIG. 1b utilizes a straight I-bar core member 32. Core member 32 has a flat inner surface which is mounted coplanar with side 39 and directly over slot 36. Slot 36 extends lengthwise across side 39, running parallel to top 37 and bottom 38. Generally, core member 32 will be attached perpendicular to slot 36. The purpose of slot 36 is to provide adequate space for wire coil 56 (shown in FIG. 2b) to be wrapped around core member 32. Because the inner surface of core member 32 is attached in a coplanar manner against side 39, slot 36 must be present to spacially accommodate the wire coil. Bevelling along the bottom edge of slot 36 helps to provide extra wrapping area close to gap 33.

Slider body 31 also comprises two outer slider rails 16 and 17, and a narrow center rail 35. The pole tip of core member 32 and the adjoining end of center rail 35 form the dimensions of head gap 33. Core member 32 is mounted to slider body 31 along the top portion of side 39 running perpendicular to top and bottom surfaces 37 and 38, respectively. The placement and relationship of core member 32 to slider body 37 combine to produce an I-shaped head structure; also referred to as an I-bar design.

The simplistic nature of the I-bar design also provides added rigidity and strength to recording head 30. A more durable head design means that manufacturing can be carried out less expensively and with higher yields. Yield loss, which might normally be attributed to breakage of protruding core member 22, is substantially reduced in head 30 since there are no fragile pieces extending outward from slider body 31. Slot 36 also has a support plate 40 which attaches to center rail 35. This support plate extends the length of the slot opening and is ordinarily formed by machining slot 36 to have a narrower vertical dimension (dimension 70 in FIG. 3). Plate 40 provides strength and stability to center rail 35; largely eliminating problems of breakage. It also acts to electrostatically and inductively shield center rail 35 from stray fields.

Although FIG. 1b shows core member 32 positioned centrally along side 39, it should be appreciated that numerous modifications in the position of core member 32 and rail 35 along side 39 can be made without detracting from the spirit or scope of the present invention. For instance, positioning the head gap at one of the outer rails 16 or 17 in a composite manner may reduce the sensitivity of the head to external fields. Alternatively, recording head 30 can also be designed for multi-track disk file application as is required for fast-access fixed-head designs. A multi-track head would have a plurality of core members 32 and rails 35, positioned along side 39. In another alternative embodiment of the present invention, core member 32 may be recessed into slot 36 of slider body 31 so that its outer surface is approximately coplaner with side 39. Of course, it should be understood that while slider body 31 and core member 32 are usually manufactured monolithically, they could be constructed in many alternative ways.

With reference to FIGS. 2a and 2b, enlarged views of the prior art head design and that of the currently preferred embodiment are shown. FIG. 2a illustrates C-shaped core member 22 comprising a vertical pole section 47 around which coil 46 is radially wrapped. Although FIG. 2a only shows a single wrapping of wire, in reality, the coil typically is wrapped many layers thick, filling open region 49.

One source of manufacturing yield loss associated with core member 22 occurs during the blending process. Initially, core 22 has square edges 50 located along the length of pole section 47. These sharp edges present cutting surfaces to wire coil 46. "Blending" refers to the process of smoothing the edges of the core member to preserve the integrity of the coil. Blending is commonly performed by skilled workers who use a fine strip of emery to manually smooth pole section 47. Because of the fragile nature of core member 22 and the manual processing that must be performed, broken cores are a frequent occurrence.

One way to combat the yield loss due to blending is to reduce the number of sharp edges around the coil region. As is evident from FIG. 2b, body portion 57 of core member 32 accomplishes this by having an outer surface which is semi-cylindrical in shape. Other shapes which do not have sharp edges may also be used. For instance, an oval or otherwise rounded geometry would be sufficient.

In the currently preferred embodiment, body 57 has a flat inner surface 60 which defines one pole of gap 33 and also provides a planer surface for attachment to side 39. The outer surface (i.e., the portion which is not flushly mounted to slider body 31) is cylindrical in shape so as to eliminate the number of rectilinear edges upon which coil 56 must contact. Consequently, core member 32 has only 2 edges which must be blended. By reducing the number of edges to be blended from four to two, manufacturing yield is improved.

As previously mentioned, it is desirable to have wire coil 56 extending as close as possible to gap 33 so as to minimize the loss of flux which may occur during readback operation. However, in prior art core member 22, coil 46 may only extend safely to the end of pole section 47 (see FIG. 2a). If the coil wire were wrapped along pole tip section 48, the coil wire wrappings could more easily protrude into the disk surface, thereby damaging the media.

In contrast, I-bar member 32 of the currently preferred embodiment comprises a pole body section 57 which allows wire coil 56 to be wrapped very near to gap 33 without risk of having the coil contact the spinning disk. The vertical nature of the I-bar design makes this possible. The proximity of coil 56 to gap 33 is limited only by the height 61 of pole tip 58 and the bevel angle 62 at the end of center rail 35. As currently implemented in the preferred embodiment, pole tip height 61 is made much smaller than the overall length of core member 32. Gap height 55, in the currently preferred embodiment, is defined solely by center rail 35.

FIG. 3 shows a cross-sectional view of the relationship between the core member 32 and slider body 31 of the present invention. Slot 36 is shown having a depth 71 and a height 70. As discussed above, because straight core member 32 is mounted flushly against side 39 of the slider body, depth 71 must be great enough to spacially accommodate the presence of wire coil 56. Support plate 40 (as shown in FIG. 1b) adds strength and durability to center rail 35 and is formed by limiting slot height 70 during the machining process. As previously mentioned, plate 40 also provides electrostatic and inductive shielding for center rail 35.

FIG. 3 also shows bevel 62 which is manufactured on the end of slider rail 35. This bevel creates additional area for wire coil 56, thereby permitting the wrapping of coil 56 closer to gap 33. Gap height 55 is shown in FIG. 3 as being defined by the end of center rail 35 and bevel 62. FIG. 3 also shows a low-angle bevel 72 (of approximately 8°) built into the trailing edge of the pole tip section of core member 32. This bevel reduces the possibility of the I-bar core member ever contacting the disk surface when it is spinning.

FIG. 4 illustrates the relationship of center rail 35, outer rails 16 and 17, and core member 32 in the currently preferred embodiment of the present invention. Note that each of the rails along bottom 38 have curved edges which improve the aerodynamics of the head as it flies over the spinning disk surface. Gap 33 is once again shown as a short line at the intersection of center rail 35 and pole tip section 58.

An additional advantage of a vertical I-bar design is that core member 32 may be produced out of a material having a lower coercivity, higher permeability and a higher saturation magnetization than that of ferrite. Typically, such substances are metallic in composition and heavier than ferrite. These heavier, metallic compositions are not easily incorporated into the C-bar design because of its convoluted, more massive structure. Generally, recording heads must be made as light as possible so that an electromagnetic actuator can quickly position the heads to any desired track on the disk. A lighter head allows more rapid movement of the electromagnetic actuator, which in turn provides faster access speed to the data. Therefore, a massive metallic C-bar structure might seriously impact access speed.

Conversely, because core member 32 of the currently preferred embodiment is much smaller and less massive to start with, metallic materials could more easily be incorporated into its design. The entire core member 32 could be made from a metallic composition, or, alternatively, only the pole tip section could be made of a metallic substance. All that is required to improve performance of the recording head is to make one or more poles metallic in composition.

Thus, an improved magnetic recording head for use in longitudinal rigid-disk recording has been described.

We claim:

1. A magnetic recording head for rigid-disk recording comprising:

a slider body having a flat air-bearing bottom surface, a top surface and a slot located across a side of said slider body;

a straight core member having an inner surface attached co-planar to said side and positioned over said slot substantially perpendicular to said bottom surface, said core member with a substantially rounded outer surface, and a tapered pole tip which forms a gap with a portion of said slider body;

a wire coil wrapped around said pole body including a portion of said rounded outer surface to thereby reduce wear on the wire, said coil extending into said slot for inducing magnetic flux across said gap during write operations and for sensing magnetic flux emanating from the disk surface during readback operations.

2. The recording head of claim 1 wherein said portion of said slider body comprises a rail attached to said bottom surface, said rail having an end which acts as one pole of said gap, said pole tip acting as the other pole.

3. The recording head of claim 2 wherein said pole body is substantially longer than said pole tip and said slot is dimensioned large enough to provide adequate space such that said wire coil may be wrapped in close proximity to said gap to minimize magnetic flux loss.

4. The recording head of claim 3 wherein said slider body further comprises a plate attached to said rail to provide mechanical support and electrostatic shielding for said end.

5. The recording head of claim 4 wherein said core member comprises ferrite.

6. The recording head of claim 4 wherein said pole tip comprises a metallic material.

7. The recording head of claim 6 wherein said core member is integrally formed to said side of said slider body.

8. A magnetic recording head for rigid-disk recording comprising:
 a slider body having a bottom surface, a top surface and a side surface, said bottom surface having a plurality of rails enabling said slider body to rest on a stationary disk and then adopt a stable flying position when said disk is spinning, said body having a transverse slot defined through and extending lengthwise across said side surface substantially parallel to said bottom surface, one of said plurality of rails having a rail tip;
 a core member having a straight pole body and a tapered pole tip, said pole body having an inner surface and a substantially rounded outer surface, said inner surface being mounted flush to said side of said slider body and positioned over said slot extending perpendicularly from said top surface to said one of said plurality of rails, said pole tip forming a gap of a predetermined height with said rail tip;
 a wire coil radially wrapped around said pole body including a portion of said rounded outer surface to thereby reduce wear on the wire, said coil inducing a magnetic field across said gap during writing operations and for sensing magnetic flux emanating from said disk during readback operations.

9. The recording head of claim 8 wherein said pole body is considerably longer than said pole tip and said rail tip is beveled to permit the wrapping of said wire coil substantially along the full length of said pole body, thereby minimizing the loss of magnetic flux emanating from either said coil to said disk or from said disk to said coil.

10. The recording head of claim 9 wherein said rail tip is attached to a plate which provides mechanical support and electrostatic shielding for said rail tip.

11. The recording head of claim 10 wherein said core member comprises ferrite.

12. The recording head of claim 9 wherein said pole tip of said core member is comprised of a metallic material offering a higher permeability and a higher saturation magnetization than ferrite.

13. A magnetic recording head for rigid-disk recording comprising a magnetic core element mounted on a slider which flies above a rotating magnetic disk, said slider having a top surface, a bottom surface along which are disposed a plurality of weight-bearing rails, and a trailing edge including a transverse slot extending lengthwise across said trailing edge substantially parallel to said bottom surface, one of said rails having a bevelled end portion which is terminated by a rail tip having a predetermined height; said core element having an upper body section and a lower tip section, said body section being substantially longer when compared to said tip section having a flat first surface mounted co-planar against said trailing edge and a semi-cylindrical outer surface, said body and extending across said trailing edge from said top surface perpendicularly across said slot without curving or blending such that said tip section forms a gap with said rail tip; said recording head further comprising a wire coil radially wrapped around said body section including a portion of said semi-cylindrical outer surface to thereby reduce wear on the wire, said coil inducing a magnetic field across said gap during writing operations and for sensing magnetic flux emanating from said disk during readback operations, said slot and said bevelled end portion allowing the wrapping of said coil substantially along the full length of said body section in close proximity to said gap to minimize magnetic flux loss.

* * * * *